United States Patent
Coleman et al.

[11] Patent Number: 6,090,420
[45] Date of Patent: Jul. 18, 2000

[54] ANIMATED CHICKEN CANDY POP COMBINATION

[76] Inventors: Thomas J. Coleman, 19170 Paddock Pl., Abingdon, Va. 24211; William K. Schlotter, IV, 117 Wateredge La., Fredericksburg, Va. 22406; Princess Ann Coleman, 19170 Paddock Pl., Abingdon, Va. 24211; Ann M. Schlotter, 117 Wateredge La., Fredericksburg, Va. 22406

[21] Appl. No.: 09/058,802

[22] Filed: Apr. 13, 1998

[51] Int. Cl.⁷ .................................................. A23G 1/00
[52] U.S. Cl. ............................ 426/104; 426/134; 446/73; 446/297
[58] Field of Search ................................ 426/90, 91, 104, 426/132, 134, 421; 446/71, 72, 73, 268, 297, 370, 386; D11/49, 50, 51, 82

[56] References Cited

U.S. PATENT DOCUMENTS

| | | | |
|---|---|---|---|
| D. 40,406 | 12/1909 | Lederer | D11/82 |
| 1,571,279 | 2/1926 | Lamb | 446/369 |
| 2,694,844 | 11/1954 | Grumbach | 24/374 |
| 3,570,173 | 3/1971 | Case | 446/365 |
| 3,615,596 | 10/1971 | Petti et al. | 426/104 |
| 5,219,163 | 6/1993 | Watson | 446/473 |
| 5,391,107 | 2/1995 | Coleman et al. | 446/484 |
| 5,676,988 | 10/1997 | Coleman et al. | 426/134 |

OTHER PUBLICATIONS

Advertisement, Rubber Chicken Keychain, from Archie McPhee (www.archiemcphee.com), Oct. 1989.
Sherri Eng, "Klutz Press Opens First Retail Store", San Jose Mercury News, 3rd paragraph, May 1995.

*Primary Examiner*—David Lacey
*Assistant Examiner*—Sherry A. Dauerman
*Attorney, Agent, or Firm*—Melvin L. Crane

[57] ABSTRACT

An animated body candy pop device comprising a main housing, an expandable sleeve in said main body, a candy stick and candy adapted to be secured to the expandable sleeve. The main housing can be solid or hollow and made with a pliable material to provide a "limp" feeling effect. The upper end of the main housing has an aperture. The expandable sleeve is inside the aperture for receiving an end of the candy stick for a snug fit. The expandable sleeve holds the upper end of the main housing slightly rigid. The lower end of the main housing has a hanger loop for displaying the product. The hanger loop can also fit around a person's wrist or used to hang onto a belt for easy carrying. The candy can be replaced with any type of lollipop. The device can be made in different body styles such as animals, fish, and insects, etc. to provide fun and entertainment for children of all ages. Further, the neck portion can be provided with a noisemaker which will make a noise when the neck is bent.

7 Claims, 1 Drawing Sheet

U.S. Patent     Jul. 18, 2000     6,090,420
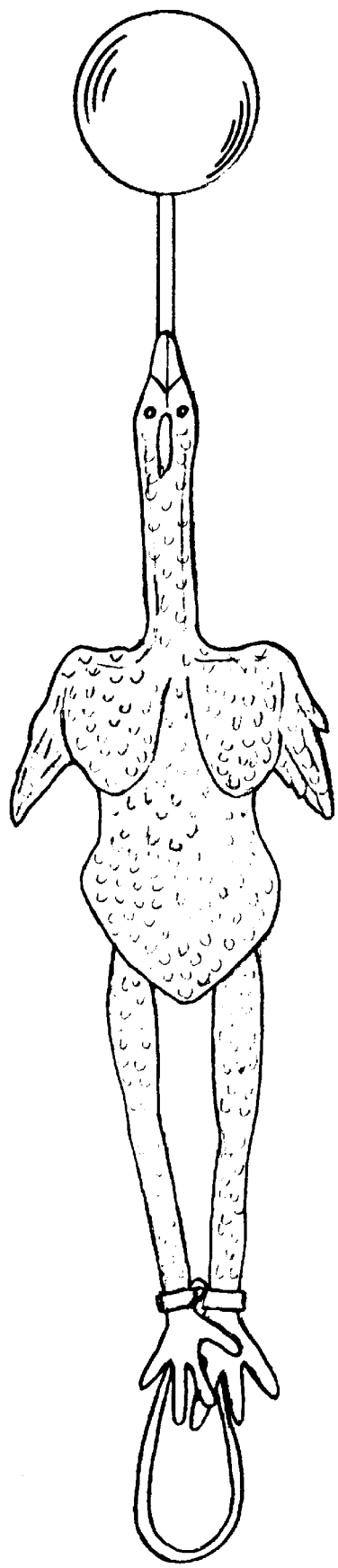

ANIMATED CHICKEN CANDY POP COMBINATION

This invention is directed to a candy pop and more particularly to an animated rubber chicken holder in combination with a candy pop.

Heretofore, candy pops have been held by many different arrangements for consumption by a person. Some patents are as follows: U.S. Pat. Nos. 5,222,627; 5,370,884; 5,531,318, and 5,676,988. A toy including an animated chicken head has been set forth in U.S. Pat. No. 3,570,173.

SUMMARY OF THE INVENTION

The present invention is directed to an animated chicken pop holder which includes a look-alike of a non-live chicken and which supports a candy pop in its mouth. The device can be held by hand while in use or hung by some means on a person's body, such as by a belt when not in use.

OBJECTS OF THE INVENTION

It is therefore an object of the invention to form an animated chicken candy pop holder which is comical and would be amusing to the user, as well as others who observe the device.

Another object of the invention is to provide an animated chicken candy pop holder which is made of any suitable material which is pliable and would have a feel of a non-live chicken.

Yet another object is to provide an animated chicken candy pop holder which can be used to hold different sized candy pop sticks for different sized candy pops.

The foregoing, along with additional features, advantages, and benefits of the invention, will be obvious from the ensuing description and claims which are accompanied by the drawing.

BRIEF DESCRIPTION OF THE DRAWING

The drawing is a top view of the animated chicken candy pop.

DETAILED DESCRIPTION

Now referring to the drawing, there is shown an animated chicken candy pop including a body 10, legs 12, feet 14, wings 16, an elongated neck portion 18, a head 20, a mouth 22, and a candy pop 24 secured to the body by a stick 26. The body can be solid or hollow and made of any suitable material such as a pliable material which would present a "limp" feeling. It is known that animated chickens have been made of rubber; however, it could be made with any pliable material. As shown by dotted lines, an expandable sleeve 21 is provided within the neck portion and the mouth provides an aperture in which a candy pop stick is inserted and which is held by the outer end of the expandable sleeve. Since the animated chicken is made of a pliable material, the neck portion of the chicken will expand with the expandable sleeve. The sleeve is made expandable in order to receive therein different sized candy pop sticks so that different sized candy pop sticks can be held in place for use by the user. As shown, the feet of the chicken are bound together by a hanger loop 30 which can be used to support the animated chicken candy pop for display for selling the device or for securing the device onto a person for use. The loop could be placed around a person's wrist for consumption of the candy pop or hung onto a person's belt for carrying the device when the candy pop is not being consumed.

The expandable sleeve not only serves to secure the candy pop stick 26 within the mouth of the animated chicken, but also serves to make the neck portion slightly rigid. In addition to the expandable sleeve, a noisemaker could be added to the neck portion that would make a noise when the neck is bent slightly. Such a noisemaker could be a material which would make a noise when the material is bent and which would return to its normal straight position when released from being bent. Thus, an added feature for amusement of the user or others would be provided.

The candy pop can be replaced subsequent to being consumed by withdrawing the candy stick and then replacing the candy stick by a candy pop on a stick. The candy pop could be secured to the mouth and not be replaceable.

The device has been shown and described as an animated chicken; however, the device could be made with any other body style such as a person, an animal, a fish, an insect, etc. Such a device will provide amusement and entertainment for persons of all ages.

The foregoing relates to preferred exemplary embodiments of the invention, it being understood that other variants and embodiments thereof are possible within the spirit and scope of the invention, the latter being defined by the appended claims.

We claim:

1. An animated body candy pop device in which said animated body is made of a pliable material,
    said animated body having an elongated neck portion and a mouth, an expandable sleeve in said neck portion that extends through said mouth,
    an aperture in said body that extends through said mouth to said expandable sleeve in said neck portion, and
    said body comprises a noisemaker in said neck portion which makes a noise when the neck portion is bent.

2. An animated body candy pop device as set forth in claim 1, wherein,
    said animated body is in the form of a chicken with extended legs.

3. An animated body candy pop device as set forth in claim 2, wherein
    said extended legs are bound by a hanger loop.

4. An animated body candy pop device as set forth in claim 2, in which
    said aperture is formed by said mouth and said neck portion of said chicken.

5. An animated body candy pop device as set forth in claim 3, in which
    said aperture is formed by said mouth and said neck portion of said chicken.

6. An animated candy pop device as set forth in claim 1, in which a candy pop is secured to the mouth of the candy pop device and which is not replaceable.

7. An animated body candy pop device as set forth in claim 1, wherein a candy pop is contained on a stick which is adapted to be secured to an outer end of said expandable sleeve.

* * * * *